(12) United States Patent
Vieira et al.

(10) Patent No.: US 11,516,844 B2
(45) Date of Patent: Nov. 29, 2022

(54) BEAMFORMING IN LISTEN-BEFORE-TALK ENVIRONMENTS

(71) Applicant: Telefonaktiebolaget LM Ericsson (publ), Stockholm (SE)

(72) Inventors: Joao Vieira, Hjärup (SE); Jung-Fu Cheng, Fremont, CA (US); Leif Wilhelmsson, Lund (SE); Johan Nilsson, Höllviken (SE); Sina Maleki, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 45 days.

(21) Appl. No.: 17/077,543

(22) Filed: Oct. 22, 2020

(65) Prior Publication Data

US 2022/0132566 A1 Apr. 28, 2022

(51) Int. Cl.
*H04W 74/08* (2009.01)
*H04W 16/28* (2009.01)

(52) U.S. Cl.
CPC ....... *H04W 74/0808* (2013.01); *H04W 16/28* (2013.01)

(58) Field of Classification Search
CPC ............... H04W 74/0808; H04W 16/28
See application file for complete search history.

(56) References Cited

U.S. PATENT DOCUMENTS

2008/0310380 A1* 12/2008 Wullich ............... H04W 28/18
                                                             370/338
2019/0021092 A1   1/2019 Fakoorian et al.
(Continued)

FOREIGN PATENT DOCUMENTS

EP    3720180 A1   10/2020
WO   2019079500 A1   4/2019

OTHER PUBLICATIONS

Girnyk, Maksym A., et al., "A Simple Cell-Specific Beamforming Technique for Multi-Antenna Wireless Communications", IEEE Wireless Communications and Networking Conference (WCNC), Seoul, South Korea, Apr. 2020, 1-4.
(Continued)

*Primary Examiner* — Ivan O Latorre
(74) *Attorney, Agent, or Firm* — Murphy, Bilak & Homiller, PLLC

(57) ABSTRACT

A beamforming method is disclosed of a multi-antenna transmitter configured for operation in a listen-before-talk (LBT) environment.
The method comprises transmitting—in transmission resources of a collection of one or more transmission resources corresponding to an LBT sensing event—according to a primary emission pattern (e.g., a primary beam) having a main lobe in a primary angular direction associated with a channel path towards an intended receiver, and transmitting according to one or more secondary emission patterns. The one or more secondary emission patterns—when accumulated over the collection of transmission resources corresponding to the LBT sensing event—are configured to indicate channel occupancy in angular directions other than the primary angular direction.
In some embodiments, the one or more secondary emission patterns comprises a plurality of secondary emission patterns (e.g., a plurality of secondary beams). Transmitting according to the one or more secondary emission patterns may comprise executing a sweep of the respective secondary beams over the collection of transmission resources corresponding to the LBT sensing event.
In some embodiments, the one or more secondary emission patterns consists of a single secondary emission pattern (e.g., an omni-directional emission pattern).
(Continued)

Corresponding apparatus, transmitter, network node, wireless communication device, and computer program product are also disclosed.

26 Claims, 7 Drawing Sheets

(56) References Cited

U.S. PATENT DOCUMENTS

| | | |
|---|---|---|
| 2019/0053269 A1* | 2/2019 | Lei .................... H04W 74/0808 |
| 2019/0141744 A1* | 5/2019 | Naghshvar ........... H04B 7/0617 |
| 2019/0230706 A1 | 7/2019 | Li et al. |
| 2019/0238204 A1* | 8/2019 | Kim ........................ H04B 1/04 |
| 2019/0373635 A1 | 12/2019 | Yang et al. |
| 2020/0096596 A1* | 3/2020 | An ............................ G01S 3/40 |
| 2020/0252806 A1 | 8/2020 | Srinivas et al. |
| 2020/0252923 A1* | 8/2020 | Yerramalli ........... H04B 7/0695 |
| 2021/0058967 A1* | 2/2021 | Oteri ..................... H04W 16/14 |
| 2021/0120431 A1* | 4/2021 | Sun ....................... H04W 72/14 |
| 2021/0120585 A1* | 4/2021 | Yang ................ H04W 74/0816 |
| 2021/0235491 A1* | 7/2021 | Iyer ................... H04W 74/0808 |
| 2021/0251002 A1* | 8/2021 | Sun ....................... H04W 16/28 |
| 2022/0061031 A1* | 2/2022 | Park ................... H04W 72/042 |

OTHER PUBLICATIONS

Harris, Fredric J., et al., "On the Use of Windows for Harmonic Analysis With the Discrete Fourier Transform", Proceedings of the IEEE, vol. 66, Jan. 1978, 1-33.

Paulraj, Arogyaswami, et al., "Introduction to Space-Time Wireless Communications", Cambridge University Press, 2003, p. 35 and section 5.3.

* cited by examiner

BEAMFORMING IN LISTEN-BEFORE-TALK ENVIRONMENTS

TECHNICAL FIELD

The present disclosure relates generally to the field of wireless communication. More particularly, it relates to beamformed transmission in listen-before-talk environments.

BACKGROUND

When a first node uses beamformed transmission towards a second node (intended receiver) in listen-before-talk (LBT) environments (e.g., in a spectrum requiring LBT before transmission), there is a risk that a third node (sensing node; a node other than the first node and the second node) cannot hear the transmission even though it takes place during the LBT sensing event of the third node. This is particularly probable when the sensing node is not in the beamforming direction of the transmission from the first node.

Consequently, the sensing node may declare the channel to be free and start a transmission of its own. Such transmission by the third node may cause interference at the second node when receiving the beamformed transmission from the first node. Alternatively or additionally, such transmission by the third node may not be properly received (e.g., if intended for the first node, which is still transmitting to the second node) and can thereby result in wasted power for the third node.

Therefore, there is a need for alternative (e.g., improved) approaches to beamformed transmission in LBT environments.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a beamforming method of a multi-antenna transmitter configured for operation in a listen-before-talk (LBT) environment. The method comprises transmitting—in transmission resources of a collection of one or more transmission resources corresponding to an LBT sensing event—according to a primary emission pattern having a main lobe in a primary angular direction associated with a channel path towards an intended receiver. The method also comprises transmitting according to one or more secondary emission patterns, wherein the one or more secondary emission patterns—when accumulated over the collection of transmission resources corresponding to the LBT sensing event—are configured to indicate channel occupancy in angular directions other than the primary angular direction.

In some embodiments, the method further comprises determining the primary angular direction.

In some embodiments, the primary emission pattern comprises a primary beam.

In some embodiments, the collection of transmission resources corresponding to the LBT sensing event comprises one or more of: time resources, frequency resources, and polarization resources.

In some embodiments, the one or more secondary emission patterns comprises a plurality of secondary emission patterns.

In some embodiments, the one or more secondary emission patterns have respective main lobes in angular directions uniformly spread in one or more angular ranges comprising one or more angular directions other than the primary angular direction.

In some embodiments, at least one of the one or more secondary emission patterns comprises at least one respective secondary beam.

In some embodiments, transmitting according to the one or more secondary emission patterns comprises executing a sweep of the respective secondary beams over the collection of transmission resources corresponding to the LBT sensing event.

In some embodiments, the one or more secondary emission patterns consists of a single secondary emission pattern.

In some embodiments, at least one of the one or more secondary emission patterns is an omni-directional emission pattern.

In some embodiments, transmitting according to the primary emission pattern is performed using a first group of antennas, and transmitting according to the one or more secondary emission patterns is performed using a second group of antennas.

In some embodiments, the method further comprises acquiring a balance parameter value which is indicative of a desired ratio between a peak energy of the primary emission pattern and an average energy of the one or more secondary emission patterns when accumulated over the collection of transmission resources, and controlling the transmission according to the primary emission pattern and/or the transmission according to the one or more secondary emission patterns based on the balance parameter value.

In some embodiments, the average energy of the one or more secondary emission patterns when accumulated over the collection of transmission resources is lower than the peak energy of the primary emission pattern.

In some embodiments, acquiring the balance parameter value comprises one or more of: determining the balance parameter value, receiving a signal indicative of the balance parameter value, and reading an identifier of balance parameter value from a storage.

In some embodiments, the balance parameter value is based on one or more of: an estimated impact of a hidden node problem, a metric quantifying a severity of the hidden node problem, a registered number of retransmissions, an estimated pathloss between the transmitter and a receiver other than the intended receiver, a location of a receiver other than the intended receiver, and a time and/or frequency usage pattern for a receiver other than the intended receiver.

In some embodiments, a first balance parameter value corresponds to one or more of: an estimated first impact of the hidden node problem, a first metric quantifying the severity of the hidden node problem, a registered first number of retransmissions, an estimated first pathloss between the transmitter and the receiver other than the intended receiver, a first location of the receiver other than the intended receiver, and a first time and/or frequency usage pattern for the receiver other than the intended receiver.

In some embodiments, a second balance parameter value corresponds to one or more of: an estimated second impact of the hidden node problem, a second metric quantifying the severity of the hidden node problem, a registered second number of retransmissions, an estimated second pathloss between the transmitter and the receiver other than the intended receiver, a second location of the receiver other than the intended receiver, and a second time and/or frequency usage pattern for the receiver other than the intended receiver.

In some embodiments, the first balance parameter value being higher than the second balance parameter value corresponds to one or more of: the estimated first impact of the hidden node problem being less detrimental than the estimated second impact of the hidden node problem, a first metric quantifying the severity of the hidden node problem being indicative of a lower severity that the second metric quantifying the severity of the hidden node problem, the registered first number of retransmissions being lower than the registered second number of retransmissions, the estimated first pathloss between the transmitter and the receiver other than the intended receiver being lower than the estimated first pathloss between the transmitter and the receiver other than the intended receiver, the first location of the receiver other than the intended receiver being closer to the transmitter than the second location of the receiver other than the intended receiver, and the first time and/or frequency usage pattern for the receiver other than the intended receiver having less overlap with the collection of transmission resources corresponding to the LBT sensing event than the second time and/or frequency usage pattern for the receiver other than the intended receiver.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is a beamforming apparatus for a multi-antenna transmitter configured for operation in a listen-before-talk (LBT) environment. The apparatus comprises controlling circuitry configured to cause transmission—in transmission resources of a collection of one or more transmission resources corresponding to an LBT sensing event—according to a primary emission pattern having a main lobe in a primary angular direction associated with a channel path towards an intended receiver, and transmission according to one or more secondary emission patterns, wherein the one or more secondary emission patterns—when accumulated over the collection of transmission resources corresponding to the LBT sensing event—are configured to indicate channel occupancy in angular directions other than the primary angular direction.

A fourth aspect is a beamforming apparatus for a multi-antenna transmitter configured for operation in a listen-before-talk (LBT) environment. The apparatus comprises a transmitter configured to transmit—in transmission resources of a collection of one or more transmission resources corresponding to an LBT sensing event—according to a primary emission pattern having a main lobe in a primary angular direction associated with a channel path towards an intended receiver, and transmit according to one or more secondary emission patterns, wherein the one or more secondary emission patterns—when accumulated over the collection of transmission resources corresponding to the LBT sensing event—are configured to indicate channel occupancy in angular directions other than the primary angular direction.

A fifth aspect is a transmitter comprising the apparatus of any of the third and fourth aspects.

A sixth aspect is a network node comprising the apparatus of any of the third and fourth aspects.

A seventh aspect is a wireless communication device comprising the apparatus of any of the third and fourth aspects.

In some embodiments, any of the above aspects may additionally have features identical with or corresponding to any of the various features as explained above for any of the other aspects.

An advantage of some embodiments is that alternative (e.g., improved) approaches are provided to beamformed transmission in LBT environments.

An advantage of some embodiments is that hidden node problems may be mitigated.

An advantage of some embodiments is that interference may be reduced.

An advantage of some embodiments is that power efficiency may be improved.

For example, when a first node uses beamformed transmission towards a second node in LBT environments while applying some embodiments, there is a lowered risk that a third—sensing—node cannot hear the transmission taking place during the LBT sensing event of the third node. Consequently, the probability is reduced that the sensing node declares the channel to be free and start a transmission of its own. Thereby, interference at the second node when receiving the beamformed transmission from the first node may be reduced. Alternatively or additionally, the power consumption of the third node may be reduced.

An advantage of some embodiments is that signaling overhead may be reduced.

An advantage of some embodiments is that a dynamic trade-off is enabled for LBT environments, between benefits of beamformed transmission and omni-directional transmission. For example, beamformed transmission may have benefits such as high array gain and high spatial re-use, while omni-directional transmission may have benefits such as low probability of transmissions colliding as described above.

BRIEF DESCRIPTION OF THE DRAWINGS

Further objects, features, and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

An exemplification of communication scenarios where some embodiments may be applicable comprises beamforming in unlicensed spectrum operation. For example, enabling networks commonly operating in licensed spectrum to also operate in a shared and/or unlicensed spectrum is an attractive approach to increase system capacity by effectively using the available spectrum.

Generally, embodiments presented herein may be applicable for operation in any LBT environment.

For a node to be allowed to transmit in unlicensed spectrum operation, it typically needs to perform a clear channel assessment (CCA) or Listen Before Talk (LBT) procedure. This procedure typically includes sensing the medium to be idle for a number of time intervals. After sensing the medium as idle, the node is typically allowed to transmit in a burst-like fashion for a maximum amount of time, sometimes referred to as the MCOT (Maximum Channel Occupancy Time). The length of the MCOT may depend on regulation and type of LBT that has been performed, and typically ranges from 1 ms to 10 ms.

A trend in the current evolution of wireless communication systems (e.g., third generation partnership, 3GPP, new radio, NR) points towards designs that rely heavily on spatial beamforming and therefore accommodate nodes equipped with multiple antennas. In the context of unlicensed spectrum operation, multi-antenna beamforming provides a possibility to enhance link quality (e.g., via array gain) as well as to increase the ability for spatial reuse.

However, a challenge when performing beamformed transmission in the context of systems operating in unlicensed spectrum is that hidden node problems may become more prominent.

Figure 1:
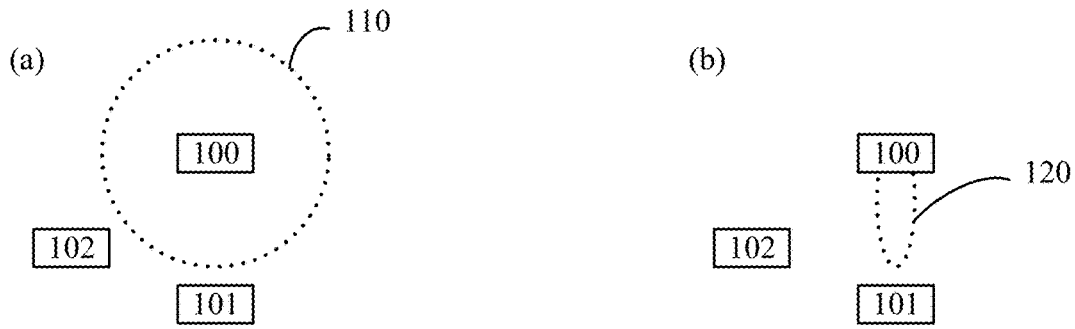
FIG. 1 is a schematic drawing illustrating differences between omni-directional transmission and beamformed transmission.

FIG. 1 schematically illustrates two scenarios: (a) omni-directional transmission from a first node 100 and (b) beamformed transmission from the first node 100.

For omni-directional transmission (a), the spatial emission pattern from the first node 100 may be schematically illustrated as a circle 110. As can be seen in FIG. 1, the emission 110 reaches a second node (the intended receiver) 101, as well as a third node 102 located—from the view point of the first node 100—in another angular direction than second node 101. Therefore, when the scenario (a) takes place in a listen-before-talk environment and the third node performs sensing, the third node can register (i.e., sense) that there is an ongoing transmission and defer from transmission of its own.

For beamformed transmission (b), the spatial emission pattern from the first node 100 may be illustrated by a schematic beam main lobe 120. As can be seen in FIG. 1, the emission 120 reaches the second node (the intended receiver) 101, but is much less likely to reach the third node 102 than in scenario (a). This is especially prominent when the third node 102 is located—from the view point of the first node 100—in another angular direction than second node 101. Therefore, when the scenario (b) takes place in a listen-before-talk environment and the third node performs sensing, the third node might not register (i.e., sense) that there is an ongoing transmission.

Consequently, the third node 102 may declare the channel to be free and start a transmission of its own. Such transmission by the third node may cause interference at the second node when receiving the beamformed transmission from the first node and/or may cause wasted power for the third node.

This phenomenon may be referred to as a hidden node problem, wherein the first node is hidden from the point-of-view of the third node.

Some approaches to mitigate a general hidden node problem involve receiver-assisted LBT (e.g., a request-to-send/clear-to-send, RTS/CTS, mechanism, wherein signaling is used to confirm the channel access state at the transmitter as well as at the receiver, or other handshaking procedures). A drawback of these approaches is that signaling overhead is introduced. Also, these approaches are typically designed for single antenna nodes, and do not exploit the additional spatial degrees of freedom offered by multi-antenna nodes.

Some approaches to mitigate a general hidden node problem may be based on transmit beamforming windowing, as the methods illustrated in "On the Use of Windows for Harmonic Analysis With the Discrete Fourier Transform" by F. J. Harris, Proceedings of the IEEE, vol. 66, pp. 51-83, January 1978. A use of such approaches for the purpose of beamforming in an unlicensed systems entails that a wideband beamformer is found that balances the directional and omnidirectional radiation properties instead of primarily focusing the energy towards the intended receiver. A drawback of these approaches is that there are typically not enough degrees of freedom to generate an energy effective beamformer suitable for mitigating the hidden node problem. For example, it may be unfeasible to generate an angular emission pattern with a narrow main lobe (for beamforming towards the intended receiver) and a constant energy power profile in all, or most, other directions (for deferring transmissions from other nodes). Also, most angular emission patterns based on beamforming windowing have nulls in many directions other than that of the main lobe. Thus, other nodes located in such directions will not defer from transmission since they will consider the channel to be clear based on sensing.

In the following, embodiments will be described where one or more hidden node problems are mitigated for beamformed transmission in LBT environments.

Generally, references made herein to a listen-before-talk (LBT) environment are meant to include any environments where a transmitter is required to perform channel sensing before initiating a transmission. Such requirements may, for example, be specified by regulation and/or standards (e.g., the IEEE 802.11 standards) or in any other manner. Application of embodiments may be particularly relevant in unlicensed spectrum environments, but may be applicable in licensed spectrum environments as well. Example environments where a transmitter is required to perform channel sensing before initiating a transmission include, but are not limited to, environments applying carrier sense multiple access with collision avoidance (CSMA/CA) and/or clear channel assessment (CCA).

Also generally, references made herein to an LBT sensing event are meant to include sensing performed by one or more third node as exemplified above (i.e., a node other than the first, transmitting, node and the second, intended receiver, node). An LBT sensing event may, for example, be defined by communication (or transmission) resources in which the sensing is performed. A communication (or transmission) resource may, for example, be defined by one or more of: a duration of time, a frequency range, and a polarization. Hence, a collection of transmission resources corresponding to an LBT sensing event may comprise one or more of: time resources, frequency resources, and polarization resources. One example of an LBT sensing event comprises time/frequency resources during 25 μs and over a 20 MHz bandwidth, as applicable for 3GPP Long Term Evolution (LTE) category 2 LBT.

Also generally, when an emission pattern is referred to herein, it may be seen as specifying a spatial emission (e.g., how much energy is emitted by the transmitter in each angular direction). Particularly, a beam may be seen as a special case of emission pattern. In typical scenarios, an emission pattern may comprise omni-directional emission, sectorized emission, or beamformed emission. Beamformed emission may, typically, comprise a main lobe and, possibly one or more side lobes. Examples of beamformed emission include pencil beams, such as discrete Fourier transform (DFT) beams. However, other emission patterns (e.g., patterns with two or more main lobes) are not excluded.

According to some embodiments, beamforming approaches are provided of a multi-antenna transmitter configured for operation in a listen-before-talk (LBT) environment.

According to some approaches, transmission is performed according to a primary emission pattern (e.g., a primary beam) having a main lobe in a primary angular direction associated with a channel path towards an intended receiver. This transmission is performed in transmission resources (e.g., all transmission resources) of a collection of one or more transmission resources corresponding to an LBT sensing event.

Such transmission resources may be known or determined by the transmitter in any suitable way. For example, transmission resources corresponding to an LBT sensing event may be regulated and/or standardized (e.g., the amount of time a sensing event must cover may be regulated/standardized). Alternatively or additionally, a potential transmitter may sense any frequency portions it desires to use.

According to some approaches, transmission is also performed according to one or more secondary emission patterns. The one or more secondary emission patterns are configured to indicate channel occupancy in angular directions other than the primary angular direction when accumulated over the collection of transmission resources corresponding to the LBT sensing event.

In some embodiments, the one or more secondary emission patterns may consist of a single secondary emission pattern (e.g., an omni-directional emission pattern). This single secondary emission pattern may be transmitted in one, some, or all transmission resources of the collection of transmission resources corresponding to the LBT sensing event.

In some embodiments, the one or more secondary emission patterns may comprise a plurality of secondary emission patterns (e.g., a plurality of secondary beams), typically having respective main lobes in other angular directions than the primary angular direction. These emission patterns may be transmitted using the collection of transmission resources corresponding to the LBT sensing event (e.g., one secondary emission pattern per transmission resource).

An advantage of some embodiments is that alternative (e.g., improved) approaches are provided to beamformed transmission in LBT environments.

An advantage of some embodiments is that hidden node problems may be mitigated.

An advantage of some embodiments is that interference may be reduced.

An advantage of some embodiments is that power efficiency may be improved.

For example, when a first node uses beamformed transmission towards a second node in LBT environments while applying some embodiments, there is a lowered risk that a third—sensing—node cannot hear the transmission taking place during the LBT sensing event of the third node. Consequently, the probability is reduced that the sensing node declares the channel to be free and start a transmission of its own. Thereby, interference at the second node when receiving the beamformed transmission from the first node may be reduced. Alternatively or additionally, the power consumption of the third node may be reduced.

An advantage of some embodiments is that signaling overhead may be reduced.

An advantage of some embodiments is that a dynamic trade-off is enabled for LBT environments, between benefits of beamformed transmission and omni-directional transmission. For example, beamformed transmission may have benefits such as high array gain and high spatial re-use, while omni-directional transmission may have benefits such as low probability of transmissions colliding as described above.

Figure 2:
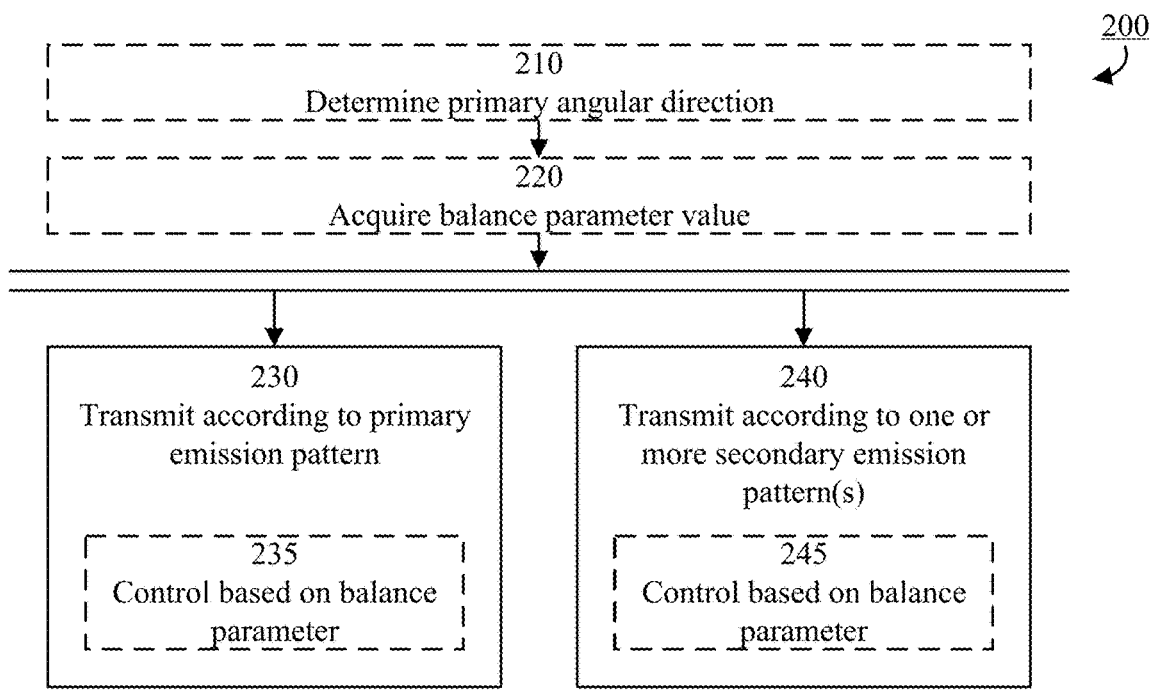
FIG. 2 is a flowchart illustrating example method steps according to some embodiments.

FIG. 2 illustrates an example method 200 according to some embodiments. The method is for beamforming and may be performed by a multi-antenna transmitter configured for operation in a listen-before-talk (LBT) environment.

As illustrated by step 230, the method comprises transmitting—in transmission resources of a collection of one or more transmission resources corresponding to an LBT sensing event—according to a primary emission pattern having a main lobe in a primary angular direction associated with a channel path towards an intended receiver (e.g., a primary angular direction corresponding to the direction of a specular channel path towards the intended receiver). This transmission can be seen as beamformed transmission for reception by the intended receiver. For example, the primary emission pattern may comprise (e.g., consist of) a primary beam.

As illustrated by optional step 210, the method may also comprise determining the primary angular direction. Typically, the primary angular direction corresponds to a channel path—a path between the transmitter node and the intended receiver node—which provides good enough link budget and/or signal-to-noise ratio (SNR) at the intended receiver.

This may be achieved by application of any suitable approach (e.g., any approach normally used to select a transmission beam for communication with an intended receiver).

For example, the primary angular direction may be inferred from feedback reports from the intended receiver, which are based on results from a beam sweeping/tracking procedure.

In some embodiments, the transmitter node may sound several beams (e.g., several DFT-like beams) and receive feedback from the receiver node based on measurements performed by the receiver node on the sounded beams. Feedback reports may, for example, comprise an index of a desired beam (as for Type 1 channel state information, CSI, in NR) or complex weights of measured channels associated with several sounded beams (as for Type 2 channel state information, CSI, in NR). In the former case, the primary angular direction may correspond to the indexed beam, in the latter case, the primary angular direction may correspond to the reported complex weights indicating highest gain or to a combination of the reported complex weights.

In some embodiments, the primary angular direction may be inferred from reversed link CSI (e.g., obtained via sounding reference signals, SRS) and channel reciprocity. For example, the transmitter node may have reverse link channel knowledge, estimated based on reference signals transmitted from the receiver node, and determine the primary angular direction as the direction where the reverse link channel has its main channel path.

Alternatively or additionally, measurements by the transmitter node during an LBT procedure can be used to dismiss some angular directions as primary angular direction (inspiration may be taken from non-published patent application PCT/EP2019/074639 which was filed on Sep. 16, 2019).

Therein, a method is disclosed of a transmitter node comprising a plurality of antenna elements and configured for beam-formed transmission in a wireless communication environment requiring clear channel assessment, CCA, before transmission. The method comprises performing CCA measurements by measuring received energy of the plurality of antenna elements, taking a CCA decision based on the measured received energy of the plurality of antenna elements, transforming the measured received energy of the plurality of antenna elements into measured received energy of a plurality of angular directions, and selecting transmission beam based on the measured received energy of the plurality of angular directions.

The method may further comprise, when the CCA decision indicates a busy channel, taking a further CCA decision based on the measured received energy of a sub-set of the plurality of angular directions, wherein the sub-set of the plurality of angular directions comprises angular directions for which the measured received energy is below a second threshold value.

When the CCA decision indicates a clear channel and the transmitter node is to transmit itself, the measurements during an LBT procedure may be analyzed to identify angular direction(s) having a measured received energy which is higher than a first threshold value (i.e., likely on-going communication in the direction(s)), and the primary angular direction may be selected as a direction other than the identified angular direction(s).

As illustrated by step 240, the method also comprises transmitting according to one or more secondary emission patterns. This transmission is performed for one or more of the transmission resources corresponding to the LBT sensing event, and—when accumulated over the collection of transmission resources corresponding to the LBT sensing event—the one or more secondary emission patterns are configured to indicate channel occupancy in angular directions other than the primary angular direction. Hence, this transmission is not (at least not primarily) for reception by the intended receiver, but rather for causing other nodes to defer from transmissions of their own.

Generally, the transmission according to one or more secondary emission patterns may comprise any suitable signal (e.g., an information carrying signal, such as a copy of the signal transmitted according to the primary emission pattern, or a "dummy" signal of some sort).

In some embodiments, the one or more secondary emission patterns consists of a single secondary emission pattern (e.g., an omni-directional emission pattern). Such a single secondary emission pattern may be transmitted in one, some, or all of the transmission resources corresponding to the LBT sensing event. These approaches are particularly suitable for analog beamforming transmitters, but can also be implemented by digital (or hybrid) beamforming transmitters.

One possible way to implement such approaches is to let the transmission according to the primary emission pattern be performed using a first group of antennas, and let the transmission according to the secondary emission pattern be performed using a second group of antennas. Typically, the first and second groups of antennas are non-overlapping (i.e., the first and second groups do not share any antenna element).

In some embodiments, the one or more secondary emission patterns comprises a plurality of secondary emission patterns. Such a plurality of secondary emission patterns may be transmitted one in each of the transmission resources corresponding to the LBT sensing event (e.g., by executing a sweep of secondary beams over the collection of transmission resources corresponding to the LBT sensing event). These approaches are particularly suitable for digital (or hybrid) beamforming transmitters.

Typically, each such secondary emission pattern has a main lobe in an angular direction other than the primary angular direction. For example, each secondary emission pattern may comprise (e.g., consist of) a secondary beam. The main lobes of the secondary emission patterns may have a width that is equal to, or larger than, the width of the main lobe of the primary emission pattern. The latter is particularly useful when the number of transmission resources corresponding to the LBT sensing event is lower than the number of possible beams with main lobe width corresponding to that of the primary emission pattern. Alternatively or additionally, the main lobes of the secondary emission patterns may all have the same width, or differing widths.

The main lobes of the secondary emission patterns may be uniformly (or otherwise) spread in one or more angular ranges comprising angular directions other than the primary angular direction. A purpose thereof is to provide transmitted energy over the angular range(s) for deferring other nodes from initiating transmissions.

Some examples of angular ranges within which it may be suitable to spread the secondary emission patterns include: an omni-directional angular range, an omni-directional angular range with the primary angular direction (or an angular range comprising the primary angular direction) excluded, a non-omni-directional angular range surrounding the primary angular direction, and a non-omni-directional angular range surrounding the primary angular direction with the primary angular direction (or an angular range comprising the primary angular direction) excluded.

As illustrated by optional step 220, the method may also comprise acquiring a value of a balance parameter b. The balance parameter indicates a desired ratio between a peak energy of the primary emission pattern and an average energy of the one or more secondary emission patterns when accumulated over the collection of transmission resources corresponding to the LBT sensing event. For example, the average may be an average over the angular range(s) over which the main lobes of the secondary emission patterns are spread, or may be an omni-directional average.

The balance parameter may be seen as representing a trade-off (e.g., in terms of energy usage) between beamformed transmission for reception by the intended receiver and transmission for causing other nodes to defer from transmissions of their own. Typically, but not necessarily, the average energy of the one or more secondary emission patterns (where the average is over the angular range(s) where the secondary emission patterns are transmitted) when accumulated over the collection of transmission resources is lower than the peak energy of the primary emission pattern.

The balance parameter value may be generally based on the applicable communication scenario. An applicable communication scenario may, for example, be defined by one or more of: the number of transmission resources corresponding to the LBT sensing event, a maximum transmission power, an energy required for proper beamformed transmission of the primary emission pattern, an energy required for proper deferral by other nodes, an estimated impact of a hidden node problem, a metric quantifying a severity of the hidden node problem, a registered number of retransmissions (e.g., requested and/or performed retransmissions), an estimated pathloss between the transmitter and a receiver other than the intended receiver, a location of a receiver other than the intended receiver, and a time and/or frequency usage pattern for a receiver other than the intended receiver.

For example, a first balance parameter value being higher than a second balance parameter value may correspond to one or more of (the epithet "first/second" indicating association with the first and second balance parameter values, respectively):

the first number of transmission resources corresponding to the LBT sensing event being higher than the second number of transmission resources corresponding to the LBT sensing event,
the first maximum transmission power being lower than the second maximum transmission power,
the first energy required for proper beamformed transmission of the primary emission pattern being higher than the second energy required for proper beamformed transmission of the primary emission pattern,
the first energy required for proper deferral by other nodes being lower than the second energy required for proper deferral by other nodes,
the estimated first impact of the hidden node problem being less detrimental than the estimated second impact of the hidden node problem,
a first metric quantifying the severity of the hidden node problem being indicative of a lower severity that the second metric quantifying the severity of the hidden node problem,
the registered first number of retransmissions being lower than the registered second number of retransmissions,
the estimated first pathloss between the transmitter and the receiver other than the intended receiver being lower than the estimated first pathloss between the transmitter and the receiver other than the intended receiver,
the first location of the receiver other than the intended receiver being closer to the transmitter than the second location of the receiver other than the intended receiver,
the first time and/or frequency usage pattern for the receiver other than the intended receiver having less overlap with the collection of transmission resources corresponding to the LBT sensing event than the second time and/or frequency usage pattern for the receiver other than the intended receiver, and
any combination thereof.

Acquiring the balance parameter value in step 220 may comprise the transmitter determining the balance parameter value itself, or receiving a signal (e.g., from the intended receiver or from a central node) indicative of the balance parameter value, or reading an identifier of balance parameter value from a storage (e.g., providing a mapping from applicable communication scenario to balance parameter value). Generally, the balance parameter value may be determined by the transmitter node, or by another node, or by regulation (e.g., a communication standard).

Determination of the balance parameter value may be in accordance with any suitable approach.

In some embodiments, the balance parameter value is determined/updated based on an estimation (e.g., by the network) of a current severity of the hidden node problem. The severity can be inferred, e.g., by analyzing the amount of re-transmissions (requested and/or performed). When the number of re-transmissions is relatively low, the hidden node problem is considered as not severe and the balance parameter may be set to a relatively high value, and vice versa.

In some embodiments, the balance parameter value is determined/updated based on estimated respective pathloss to communication nodes in the vicinity of the transmitter node. Estimation of the pathloss to other communication nodes may be achieved based on received power and transmitted power (e.g., assuming a typical value if not explicitly signalled). The highest pathloss may be used to determine the balance parameter value, for example, such that the transmission power used for the secondary emission pattern is detectable in LBT sensing after the highest pathloss.

In some embodiments, the balance parameter value is determined/updated based on information (e.g., in a database) regarding communication nodes in a geographical area the vicinity of the transmitter node. The database may be available through a second hand party (i.e., not the network operator) or may be determined by the communication network itself (e.g., based on sensing results of different network nodes in different geographical areas and over different time and frequency components). The information may, for example, relate to one or more of: the location of the communication node, and communication specifics for time and/or frequency domain, and may be used to identify nodes that may contribute to the hidden node problem. The balance parameter value may be selected such that all identified nodes will be able to detect the transmission according to the secondary emission pattern.

The acquired value of the balance parameter may be used in steps 230 and/or 240, to control transmission according to the primary emission pattern and/or transmission according to the one or more secondary emission patterns. This is illustrated by optional sub-steps 235 and 245, respectively. For example, the control may relate to one or more of: transmission power for the primary emission pattern, transmission power for the secondary transmission pattern(s), number of secondary transmission pattern(s), angular range(s) over which the main lobes of the secondary emission patterns are spread, etc. When transmission according to the primary emission pattern is performed using a first group of antennas and transmission according to the secondary emission pattern is performed using a second group of antennas, the control of sub-steps 235 and 245 may relate to assigning an amount of transmission power for each of the groups and/or determining the number of antennas of each of the groups.

Figure 3:
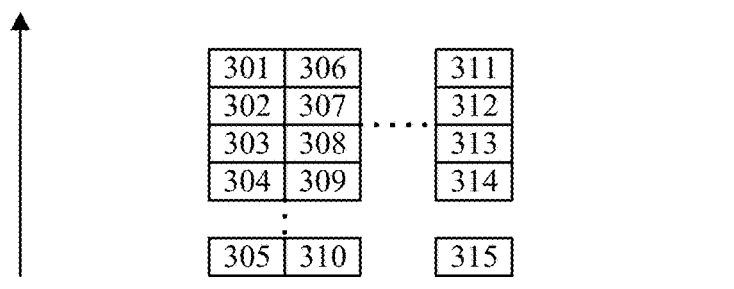
FIG. 3 is a time/frequency grid schematically illustrating example transmission resources according to some embodiments.

FIG. 3 schematically illustrates some example transmission resources 301-315 according to some embodiments. The example transmission resources are time/frequency resources, wherein time is shown in the x-axis and frequency is shown on the y-axis.

Transmission resources that correspond to an LBT sensing even may be all transmission resources 301-315 of FIG. 3, or a subset thereof (e.g., limited to a certain time duration and/or a certain frequency interval).

For example, when transmission according to the primary emission pattern is performed by the transmitter node in all transmission resources 301-315 of FIG. 3 for reception by the intended receiver node, transmission according to the one or more secondary emission pattern(s) may be performed in transmission resources that correspond to an LBT sensing event of another node to cause it to defer from transmission of its own.

Alternatively or additionally, when transmission according to the primary emission pattern is performed by the transmitter node in some of the transmission resources 301-315 of FIG. 3 (e.g., limited to a certain time duration and/or a certain frequency interval) for reception by the intended receiver node, transmission according to the one or more secondary emission pattern(s) may be performed in at least transmission resources where transmission according to the primary emission pattern is performed and that correspond to an LBT sensing event of another node to cause it to defer from transmission of its own.

A few implementation examples will now be presented regarding the transmission according to the primary and secondary emission patterns (compare with steps 230 and 240 of FIG. 2), and the determination of the balance parameter value (compare with step 220 of FIG. 2).

In examples where the beamforming is fully digital, the transmission according to the primary and secondary emission patterns may comprise transmission—in each transmission resource that corresponds to an LBT sensing event—of the primary beam and a respective secondary beam, wherein an accumulation of the secondary beams represents a close to omni-directional emission pattern (compare with beam sweeping).

For example, if the collection of transmission resources that correspond to an LBT sensing event comprises N mutually non-overlapping resources (e.g., time/frequency resources), the transmission according to the primary and secondary emission patterns may be controlled by discretizing the range of angular directions for transmission (e.g., from 0° to 180°) into N+1 equally spaced samples. The angular discretization is preferably done such that one sample/direction corresponds to the primary angular direction. The other N samples/directions may represent secondary angular directions, e.g., corresponding to main lobe directions for the respective secondary beams. To exemplify, if the primary angular direction is $\alpha°$, then the $n^{th}$ secondary angular direction, $\beta_n$, $1 \leq n \leq N$, is given by $\beta_n = [\alpha° + n180°/(N+1)]$ mod $180°$.

Given the discretization, a primary emission pattern (e.g., a primary beam, such as a pencil beam or a DFT beam) is transmitted with its main lobe in the primary angular direction $\alpha°$, in each of the N transmission resources, and a respective secondary emission pattern (e.g., a respective secondary beam, such as a pencil beam or a DFT beam) is transmitted in each of the N transmission resources, with main lobes in respective ones of the secondary angular directions $\beta_n$. The transmission energy used in each transmission resource for the primary emission pattern may be denoted $E_m$ and the transmission energy used for each of the secondary emission patterns may be denoted $E_s$.

This example procedure results in two emission patterns (e.g., two pencil beams) are overlaid, or super-positioned, for each transmission resource corresponding to an LBT sensing event; one pointing in the primary angular direction for all of the transmission resources, and another one pointing in another direction which is varying between the transmission resources.

Figure 4:
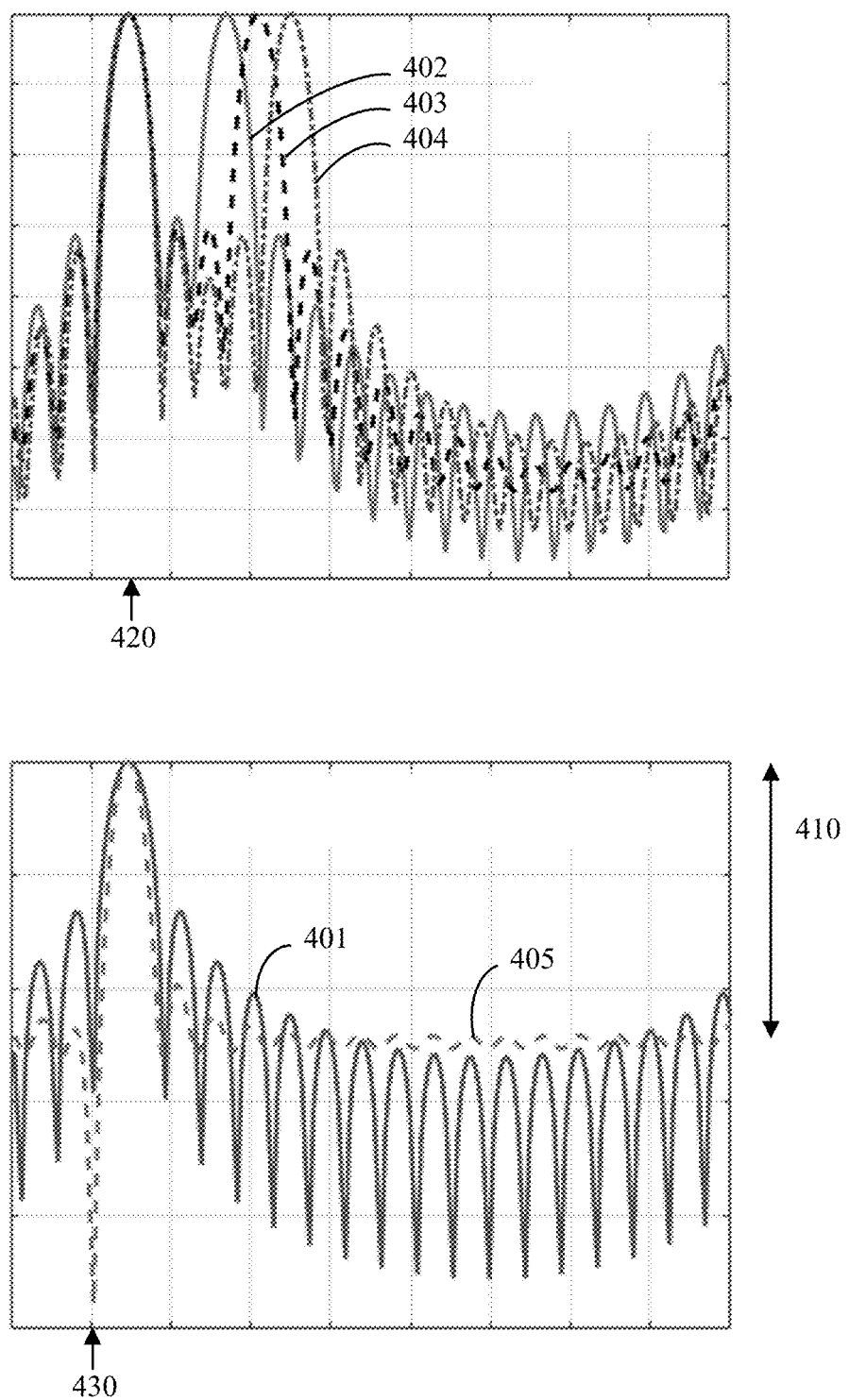
FIG. 4 is a plot illustrating example emission patterns according to some embodiments.

FIG. 4 illustrates an example of this construction for a linear antenna array with M=20 omni-directional antennas, where the number of transmission resources equals the number of antennas N=M, and wherein the primary and secondary beams have the same associated energy, $E_m/E_s=1$.

In the upper plot of FIG. 4, the x-axis shows the angular range from 0° to 180° with the primary angular direction 420 at approximately 30°, and the y-axis shows radiated energy from −16 to 0 dB. Emissions 402, 403, 404 at three different transmission resources are illustrated; exemplifying a plurality of secondary emission patterns. It can be seen that each emission comprises an energy peak in the primary angular direction 420 and another energy peak in one (varying) secondary angular direction.

From an LBT perspective of another—sensing—node, only the accumulation of the energy transmitted in all transmission resources is of interest. Such an accumulation 405 (corresponding to emissions as described for the upper plot) is illustrated in the lower plot of FIG. 4, where the x-axis shows the angular range from 0° to 180°, and the y-axis shows normalized sum of radiated energy in all transmission resources from −25 to 0 dB. Thus, the accumulation 405 does not refer to a snapshot of the "instantaneous" transmitted energy in a given transmission resource, but rather to the transmitted energy averaged over the transmission resources corresponding to an LBT sensing event (e.g., transmission resources that are sensed during an LBT procedure by another node).

It can be seen that the accumulated emission 405 comprises an energy peak in the primary angular direction and a relatively constant energy floor in almost all other angular directions. The relation between the energy peak and the energy floor is shown as 410 and may, for example, be a function of the value of the balance parameter b. The energy dip seen at angular direction 430 may be removed, for example, by putting the main lobe of an extra beam here (e.g., with relatively low energy in each of the transmission resources, or with energy $E_s$ in only one transmission resource).

The result of transmitting a single primary beam (e.g., a DFT beam) 401 is shown for comparison; corresponding to an exemplification of a primary emission pattern. It can be seen that the single primary beam 401 has numerous directions with very low energy, making such transmission much more exposed to the hidden node problem than transmission according to the proposed approach (represented by the emission accumulation 405) which has a relatively constant energy floor in angular directions other than the primary angular direction.

It may be noted that, since $E_m/E_s=1$, half of the transmit energy is focused towards the intended receiver, and the rest of the transmit energy is used for deferring other nodes from transmitting. This results in a loss in raw throughput rate for the transmission to the intended receive but mitigates the hidden node problem, thereby trading off energy received at the intended receiver (benefit of beamformed transmission) against hidden node problem mitigation (benefit of omni-directional transmission). For example, the loss on raw throughput rate may be compensated by a decreased number of retransmissions due to hidden node problem mitigation.

The balance parameter b represents an example implementation for the trade-off between benefits of beamformed transmission and omni-directional transmission. For example, the balance parameter may be defined in dB as $b=N+10\log_{10}(E_m/E_s)$, i.e., $E_m/E_s=10^{(b-N)/10}$ where b and N are expressed in dB.

In FIG. 4, the relation 410 between the energy peak and the energy floor is approximately 13 dB, which can be adjusted by varying one or more of N, $E_m$, and $E_s$ (possibly under a constraint regarding a maximum transmission power, which limits the value for $E_m+E_s$).

Figure 5:
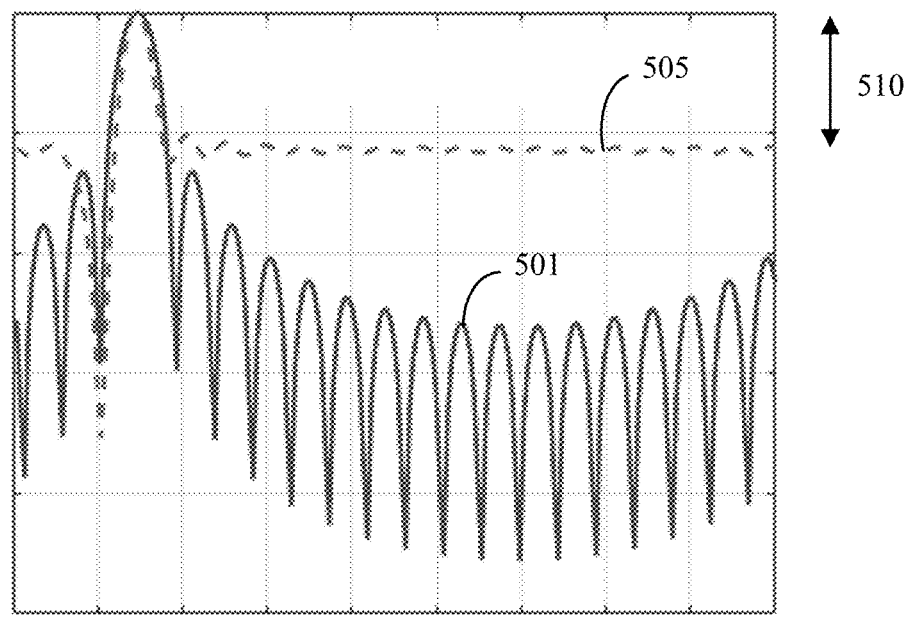
FIG. 5 is a plot illustrating example emission patterns according to some embodiments.

FIG. 5 illustrates an example plot corresponding to the lower plot of FIG. 4, but with $E_m/E_s=0.1995$, which results in b≈6 dB as manifested by the relation 510 between the energy peak and the energy floor of the accumulated emission 505. The x-axis shows the angular range from 0° to 180°, and the y-axis shows normalized sum of radiated energy in all transmission resources from −25 to 0 dB. As in FIG. 4, it can be seen that the accumulated emission 505 comprises an energy peak in the primary angular direction and a relatively constant energy floor in almost all other angular directions.

The result of transmitting a single primary beam (e.g., a DFT beam) 501 is also shown for comparison. As in FIG. 4, it can be seen that the single primary beam 501 has numerous directions with very low energy, making such transmission much more exposed to the hidden node problem than transmission according to the proposed approach (represented by the emission accumulation 505) which has a relatively constant energy floor in angular directions other than the primary angular direction. Furthermore, for this scenario the energy floor of the accumulated emission 505 is substantially higher than side lobe emissions of the single primary beam 501, making transmission of the single primary beam 501 even more exposed to the hidden node problem compared to transmission according to the proposed approach.

Figure 6:
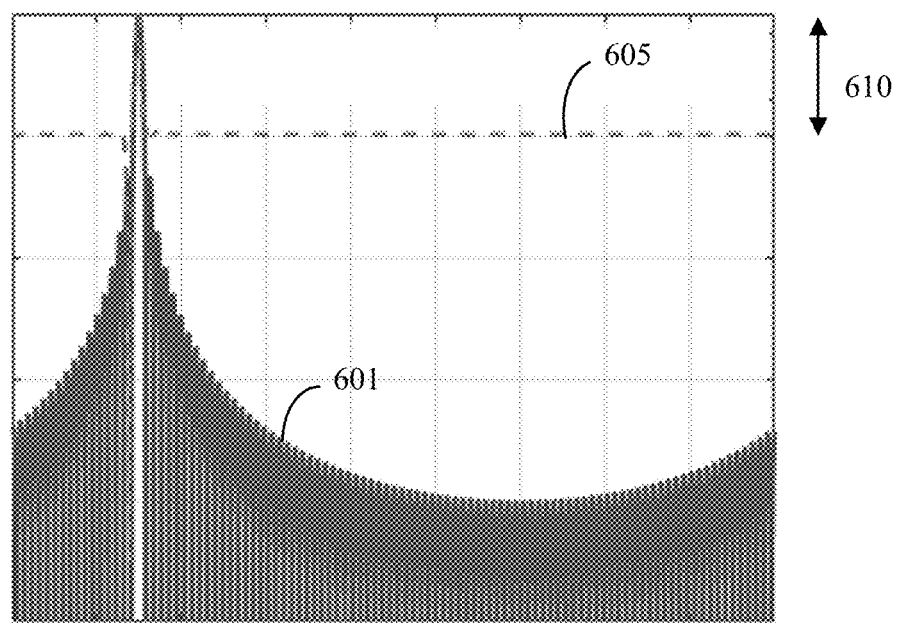
FIG. 6 is a plot illustrating example emission patterns according to some embodiments.

FIG. 6 illustrates an example plot corresponding to the lower plot of FIG. 4, but with $E_m/E_s=0.0316$ and N=100, which results in b 5 dB as manifested by the relation 610 between the energy peak and the energy floor of the accumulated emission 605. The x-axis shows the angular range from 0° to 180°, and the y-axis shows normalized sum of radiated energy in all transmission resources from −25 to 0 dB. As in FIG. 4, it can be seen that the accumulated emission 605 comprises an energy peak in the primary angular direction and a relatively constant energy floor in almost all other angular directions.

The result of transmitting a single primary beam (e.g., a DFT beam) 601 is also shown for comparison. It can be seen that the single primary beam 601 has numerous directions with very low energy, and that the energy floor of the accumulated emission 605 is substantially higher than side lobe emissions of the single primary beam 601, making transmission of the single primary beam 601 inferior to transmission according to the proposed approach (represented by the emission accumulation 605) in relation to the hidden node problem.

Since secondary beams with main lobe directions close to the primary angular direction may interfere with the primary beam (an effect which is reduced when N increases), some embodiments propose application of a correction factor c to account for the inter-beam interference during the energy normalization; e.g., the energies for primary and secondary emissions may be related as $E_m/E_s=c10^{(b-N)/10}$, where b and N are expressed in dB. The correction factor can be computed offline for a number of different systems setups and tabulated. The value of $E_m/E_s$ may be computed during operation, or may be determined by addressing a storage providing mapping from a desired value of b to $E_m/E_s$.

An application of the approach described in connection with FIGS. 4-6 is for fully digital beamforming (i.e., one transceiver chain per antenna), where different time/frequency grid parts can be mapped to different parts of the available bandwidth. In this context, each composite emission pattern comprising the primary emission pattern and a secondary emission pattern (e.g., as illustrated by the upper plot of FIG. 4) may correspond to a group of subcarriers and/or physical resource blocks (PRBs), and the accumulated emission pattern (e.g., as illustrated by the lower plot of FIG. 4) may correspond to the emission during an orthogonal frequency division multiplex (OFDM) symbol (i.e., no other averaging in time is needed).

In some embodiments, the range of each piece of time/frequency grid part may account for the precoder needing to be fixed for some frequency span. In new radio (NR), the smallest precoding granularity is 2 PRBs (see, e.g., clause 5.1.2.3 in third generation partnership project technical specification, 3GPP TS 38.214), which corresponds to 360 kHz for a sub-carrier spacing of 15 kHz. Thus, in a 20 MHz transmission there is are approximately 55 (20000/360) possible time/frequency grid parts, which provides good flexibility to construct the precoder. In time, the precoder and/or its parameters can be changed on OFDM symbol basis.

Another application of the approach described in connection with FIGS. 4-6 is for hybrid beamforming (e.g., with two associated transceiver chains), where different time/frequency grid parts can be mapped to different time instances. Each of the two transceiver chains can be able to create a respective one of the primary and secondary emission patterns. This approach is equally applicable for fully digital beamforming.

For hybrid beamforming with three or more associated transceiver chains, a mixture of the applications above may be used; i.e., mapping different time/frequency grid parts to different parts of the available bandwidth and to different time instances. This approach is equally applicable for fully digital beamforming.

In the examples above, it was assumed that M=N, i.e., that the number of antennas (corresponding to a number of DFT-beams) equals the number of transmission resources corresponding to an LBT sensing event. Then, one DFT-beam may be used as secondary beam for each of the transmission resources. When there is a large number of antennas and/or limited number of transmission resources (e.g., when M>N), this may not be a preferred approach. For example, the approach may fail to provide a relatively constant energy floor and may instead present disadvantageous energy fluctuations.

Instead, a similar approach may be used wherein beams are used with a width that is variable and/or wider than DFT beams. Generally, it is preferable that the combination of all secondary beams forms an emission pattern that is roughly omnidirectional in all directions other than the primary angular direction (there, the emission pattern formed by the combination of all secondary beams may preferably have a null or a relatively low energy).

For example, the primary beam may have any width (e.g., a width which is different from the widths of the secondary beams). Alternatively or additionally, each of the secondary beams may have any width (e.g., the same width for all secondary beams, or varying between different secondary beams). One illustration is using the same widths of primary and secondary beams (e.g., x times wider can the width of the narrowest possible DFT-beam when M=xN). Then, the system will effectively work as illustrated in FIGS. 4-6. For example, such beams may be constructed using window functions as exemplified in "A Simple Cell-Specific Beamforming Technique for Multi-Antenna Wireless Communications" by Maksym A. Girnyk and Sven O. Petersson, IEEE Wireless Communications and Networking Conference (WCNC), Seoul, South Korea, April 2020.

In examples where the beamforming is analog, the transmission according to the primary and secondary emission patterns may comprise transmission—in each transmission resource that correspond to an LBT sensing event—of a primary beam (e.g., using a first group of antennas) and an omni-directional emission pattern (e.g., using a second group of antennas). These approaches are applicable, for example, for an analog beamforming transmitter capable of separate beamforming in each of two polarizations, or otherwise equipped with two separate analog beamformers. Furthermore, these approaches are equally applicable for fully digital beamforming and for hybrid beamforming.

For example, the M antennas may be divided into two non-overlapping groups (e.g., sub-arrays); the first group having $M_1$ antennas and the second group having $M_2=M-M_1$ antennas. Letting the antennas of the first group apply analog beamforming to transmit the primary beam and letting the antennas of the second group simultaneously transmit according to an omni-directional emission pattern, the resulting emission will have similar features as the accumulations 405, 505, 605 described above.

The directional transmission of the first group may be formed using any suitable beamforming approach (e.g., using transmit beamforming windowing or a DFT beam). In analog beamforming, the directional transmission of the first group may be achieved by, for example, applying the corresponding beamforming weights to each antenna of the first group (same beamforming weights for both polarizations).

The omni-directional transmissions of the second group may be formed by using any suitable omni-directional transmission approach. For example, an omni-directional emission pattern may be achieved by applying one beamforming weight for one of the antennas of the second group (resulting in an omni-directional emission) and progressively change the phase for each of the other antennas of the second group such that the shape of the resulting emission pattern remains the same as the omni-directional emission of the one antenna. Possible ways to achieve this are exemplified in "A Simple Cell-Specific Beamforming Technique for Multi-Antenna Wireless Communications" by Maksym A. Girnyk and Sven O. Petersson, IEEE Wireless Communications and Networking Conference (WCNC), Seoul, South Korea, April 2020.

Thus, some of the transmit energy is focused towards the intended receiver, and the rest of the transmit energy is used for deferring other nodes from transmitting. As before, this may be seen as trading off energy received at the intended receiver (benefit of beamformed transmission) against hidden node problem mitigation (benefit of omni-directional transmission), and the balance parameter b represents an example implementation for the trade-off.

In some embodiments, the number of antennas in each of the first and second groups is fixed, and the trade-off is implemented by varying the ratio between the energies assigned for each of the groups. If both groups of antennas operate with similar hardware, this solution may imply that at least one group will generally not operate at maximum transmit power (which may entail that the power amplifier(s) associated with that group of antennas operate at in a region which may have less than optimal energy efficiency).

In some embodiments, the number of antennas in at least one (e.g., each) of the first and second groups is variable. Then, the trade-off may be implemented by varying $M_1$ and/or $M_2$, which may, for example, be implemented by adjustment of analog phase shifters for antennas switching group. This approach may be combined with varying the ratio between the energies assigned for each of the groups, or may be applied instead of varying the ratio between the energies assigned for each of the groups. In the latter case, maximum transmit power may be applied for all of the antennas. For example, the number of antennas in each group for a particular balance parameter value may be determined by solving $M_1^2=bM_2$ under the constraint that $M_1+M_2=M$ (assuming that the directional beamforming provides a main lobe with $M_1$ beamforming gain, which is true, e.g., for a DFT beam, and the omni-directional transmission has no beamforming gain).

In some embodiments, it is variable which antennas belong to the first and second groups. This approach may be combined with varying the ratio between the energies assigned for each of the groups, and/or with varying the number of antennas in each of the first and second groups. For example, if every odd antenna of the antenna array is assigned to the first group, the array aperture is larger than if neighboring antennas would be assigned to the first group and a beam of the primary emission pattern can be made narrower.

Generally, any of the approaches described herein may be combined, as suitable. For example, an approach producing an omni-directional accumulated secondary emission pattern (compare with FIGS. 4-6) may be applied in some transmission resources, while an approach with instantaneous omni-directional secondary emission pattern may be applied in other transmission resources. Which transmission resources are applicable for which approach may be determined based on a time and/or frequency hopping pattern, for example.

As understood from the examples herein, some embodiments comprise transmitting according to a primary emission pattern in all transmission resources corresponding to an LBT sensing event and transmitting according to one or more secondary emission patterns in all transmission resources corresponding to the LBT sensing event (i.e., all transmission resources comprise transmission according to both the primary emission pattern and a secondary emission pattern).

Alternatively, only some embodiments comprise transmitting according to a primary emission pattern in some transmission resources corresponding to an LBT sensing event and/or transmitting according to one or more secondary emission patterns in only some (possibly different) transmission resources corresponding to the LBT sensing event (i.e., not all transmission resources comprise transmission according to both the primary emission pattern and a secondary emission pattern).

For example, each transmission resource may comprise transmission according to either of the primary emission pattern and a secondary emission pattern (e.g., a secondary beam or an omni-directional pattern). Which transmission resources comprise transmission according to which emission patterns may be determined based on a time and/or frequency hopping pattern, for example. Alternatively or additionally, the ratio between the number of transmission resources comprising transmission according to the primary emission pattern and the number of transmission resources comprising transmission according to a secondary emission pattern may be determined in a similar manner as the ratio $E_m/E_s$ elaborated on above.

In some embodiments, the secondary emission pattern as accumulated over the transmission resources corresponding to the LBT sensing event may have non-omni-directional coverage. This may be particularly beneficial if location(s) are known of other node(s) potentially contributing to the hidden node problem (angular directions toward such locations may then be covered by the secondary emissions). Alternatively or additionally, the secondary emissions may be designed to cover angular directions close to the primary angular direction (other node(s) close to the intended receiver may be particularly harmful in relation to the hidden node problem).

For example, the accumulated second emission pattern may have an angular width which is non-omni-directional. The accumulated second emission pattern (e.g., the angular width thereof) may be variable (e.g., dynamically variable in relation to a current communication scenario).

Similarly to the balance parameter value, the angular width of the accumulated second emission pattern may be varied based on interference, number or retransmissions, etc. For example, when the intended receiver reports persistent interference, the transmitter can gradually increase the angular width and evaluate if the interference disappears; and when the intended receiver does not report persistent interference, the angular width can be gradually reduced.

Figure 7:
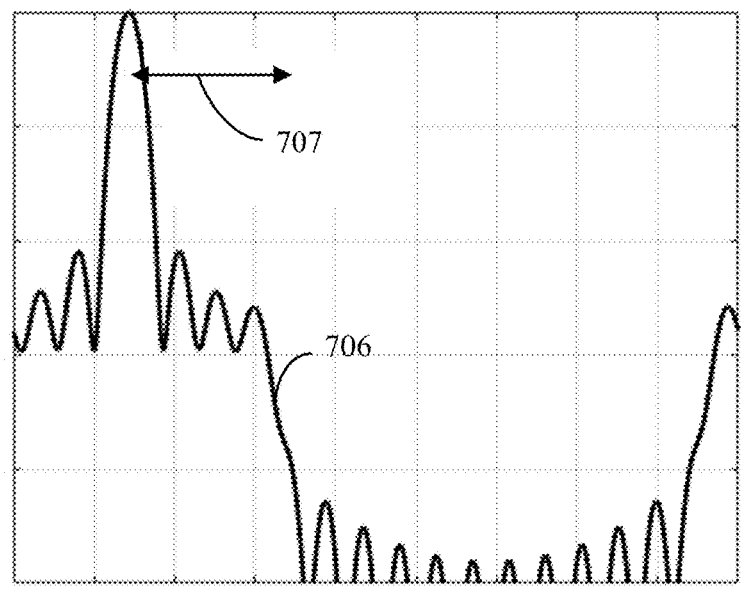
FIG. 7 is a plot illustrating example emission patterns according to some embodiments.

FIG. 7 illustrates an example accumulated emission pattern 706 (compare with 401, 501, 601) according to some embodiments, wherein the secondary emissions are designed to cover angular directions closer to the primary angular direction than an angular distance 707 (half of the angular width). The x-axis shows the angular range from 0° to 180°, and the y-axis shows radiated energy from −25 to 0 dB.

Figure 8:
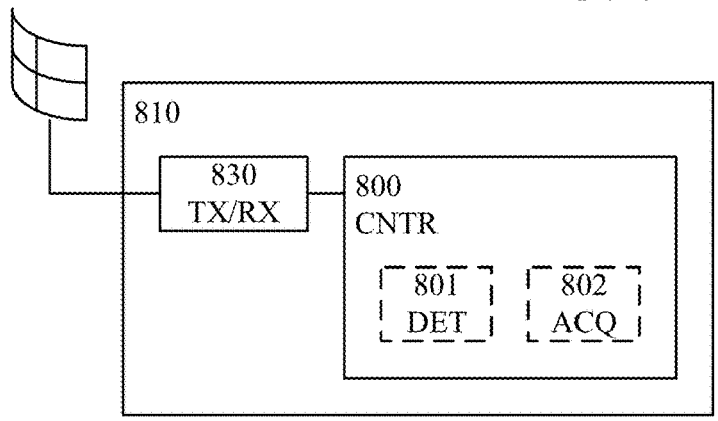
FIG. 8 is a schematic block diagram illustrating an example apparatus according to some embodiments.

FIG. 8 schematically illustrates an example apparatus 810 according to some embodiments. The apparatus 810 is a beamforming apparatus for a multi-antenna transmitter configured for operation in a listen-before-talk (LBT) environment. For example, the apparatus 810 may be comprised (or comprisable) in a transmitter, a network node (e.g., a radio access node such as a base station, or a centralized node), or a wireless communication device (e.g., a user equipment—UE, or a station—STA).

The apparatus 810 may, for example, be configured to perform one or more steps of the example method 200 of FIG. 2, or otherwise described herein. Generally, any feature or advantage mentioned herein in connection to a method may be equally applicable in relation to the corresponding apparatus (e.g., the example apparatus 810).

The apparatus 810 comprises a controller (CNTR; e.g., controlling circuitry or a control module) 800.

The controller is configured to cause transmission—in transmission resources of a collection of one or more transmission resources corresponding to an LBT sensing event—according to a primary emission pattern having a main lobe in a primary angular direction associated with a channel path towards an intended receiver (compare with step 230 of FIG. 2), and transmission according to one or more secondary emission patterns (compare with step 240 of FIG. 2), wherein the one or more secondary emission patterns—when accumulated over the collection of transmission resources corresponding to the LBT sensing event—are configured to indicate channel occupancy in angular directions other than the primary angular direction.

To this end, the controller may be associated with (e.g., connected, or connectable, to) a transmitter (TX, e.g., transmitting circuitry or a transmission module), illustrated in FIG. 8 as part of a transceiver (TX/RX) 830. The transmitter may be comprised in the apparatus 810 as illustrated in FIG. 8, or may be external to and associated with (e.g., connected, or connectable, to) the apparatus. In any case, the transmitter may be configured to transmit according to the primary and secondary emission patterns as described above.

The controller may be further configured to cause determination of the primary angular direction (compare with step 210 of FIG. 2). To this end, the controller may comprise, or be otherwise associated with (e.g., connected, or connectable, to) a determiner (DET; e.g., determining circuitry or a determination module) 801. The determiner may be configured to determine the primary angular direction.

The controller may be further configured to cause acquisition of a balance parameter value which is indicative of a desired ratio between a peak energy of the primary emission pattern and an average energy of the one or more secondary emission patterns when accumulated over the collection of transmission resources (compare with step 220 of FIG. 2). To this end, the controller may comprise, or be otherwise associated with (e.g., connected, or connectable, to) an acquirer (ACQ; e.g., acquiring circuitry or an acquisition module) 802. The acquirer may be configured to acquire the balance parameter value.

In various embodiments, the acquirer may comprise one or more of: a determiner configured to determine the balance parameter value, a receiver (e.g., part of the transceiver 830) configured to receive a signal indicative of the balance parameter value, and a storage parser configured to read an identifier of the balance parameter value from a storage.

The controller may be further configured to cause control of the transmission according to the primary emission pattern and/or the transmission according to the one or more secondary emission patterns based on the balance parameter value (compare with sub-steps 235 and 245 of FIG. 2).

In some variants of the apparatus 810, the controller is optional and the transmitter comprises a transmitter (e.g., part of the transceiver 830) configured to transmit—in transmission resources of a collection of one or more transmission resources corresponding to an LBT sensing event—according to a primary emission pattern having a main lobe in a primary angular direction associated with a channel path towards an intended receiver, and transmit according to one or more secondary emission patterns, wherein the one or more secondary emission patterns—when accumulated over the collection of transmission resources corresponding to the LBT sensing event—are configured to indicate channel occupancy in angular directions other than the primary angular direction.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a network node.

Embodiments may appear within an electronic apparatus (such as a wireless communication device or a network node) comprising arrangements, circuitry, and/or logic according to any of the embodiments described herein. Alternatively or additionally, an electronic apparatus (such as a wireless communication device or a network node) may be configured to perform methods according to any of the embodiments described herein.

Figure 9:
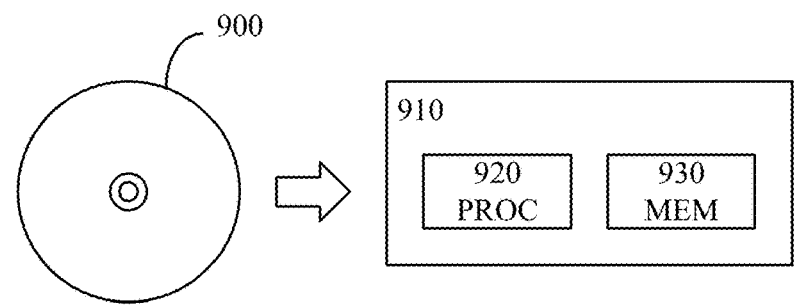
FIG. 9 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 9 illustrates an example computer readable medium in the form of a compact disc (CD) ROM 900. The computer readable medium has stored thereon a computer program comprising program instructions. The computer program is loadable into a data processor (PROC; e.g., data processing circuitry or a data processing unit) 920, which may, for example, be comprised in a wireless communication device or a network node 910. When loaded into the data processor, the computer program may be stored in a memory (MEM) 930 associated with or comprised in the data-processing unit. According to some embodiments, the computer program may, when loaded into and run by the data processor, cause execution of method steps according to, for example, any of the methods illustrated in FIG. 2 or otherwise described herein.

Figure 10:
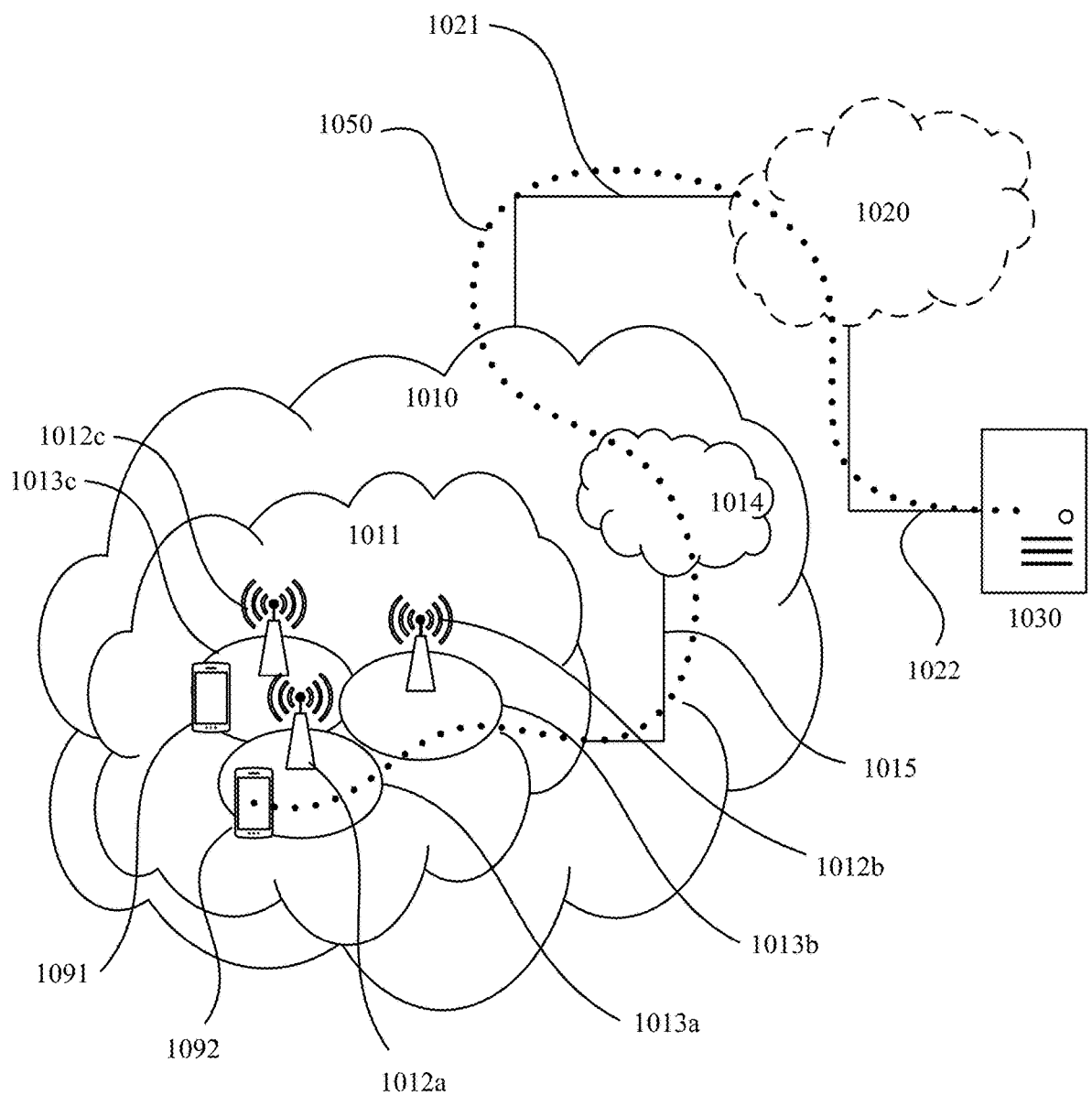
FIG. 10 illustrates a telecommunication network connected via an intermediate network to a host computer in accordance with some embodiments.

With reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A first UE 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 11. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE

1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

Figure 11:
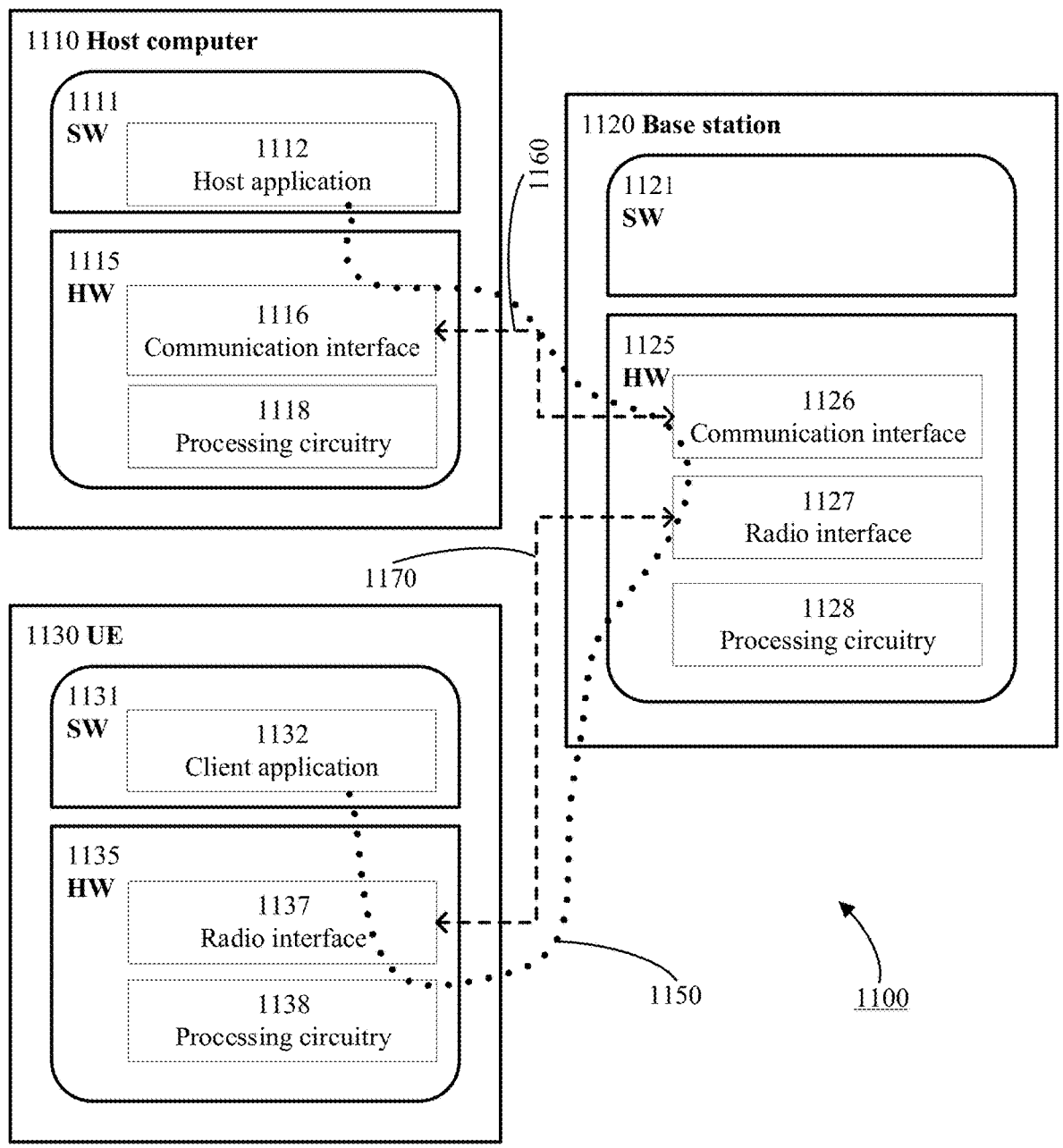
FIG. 11 illustrates a host computer communicating via a base station with a user equipment over a partially wireless connection in accordance with some embodiments.

It is noted that host computer 1110, base station 1120 and UE 1130 illustrated in FIG. 11 may be similar or identical to host computer 1030, one of base stations 1012a, 1012b, 1012c and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve interference and/or power efficiency in listen-before-talk environments and thereby provide benefits such as improved communication performance and/or longer battery life time.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

Figure 12:
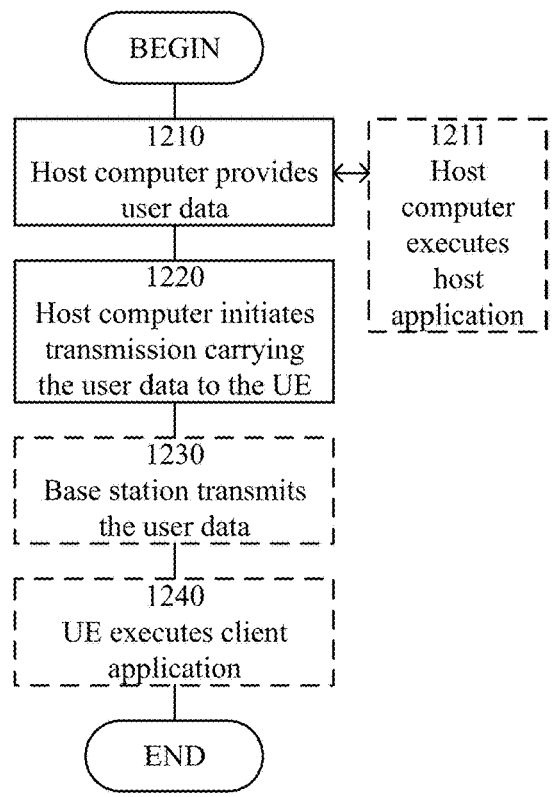
FIG. 12 is a flowchart illustrating example method steps implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

Figure 13:
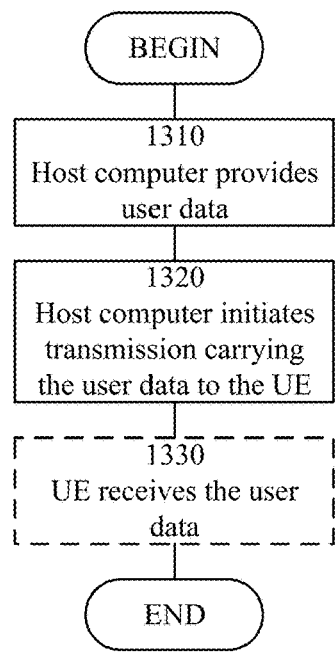
FIG. 13 is a flowchart illustrating example method steps implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figure 14:
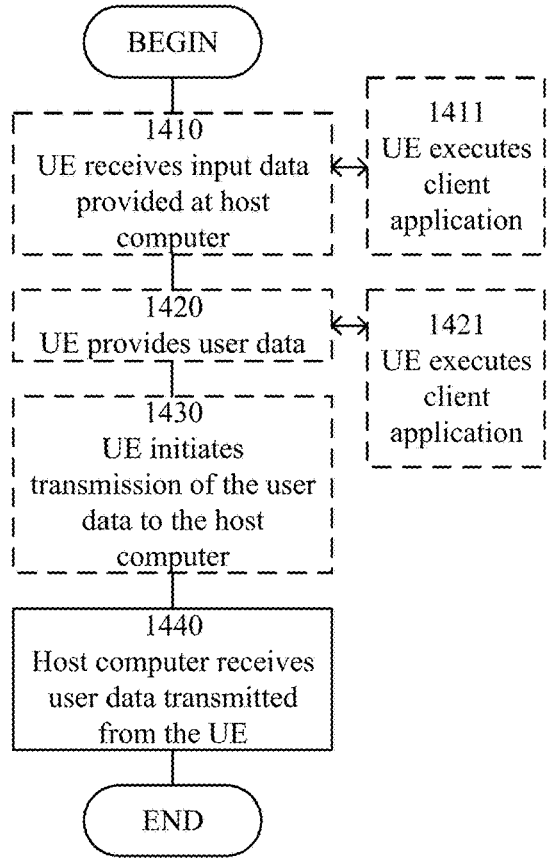
FIG. 14 is a flowchart illustrating example method steps implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

Figure 15:
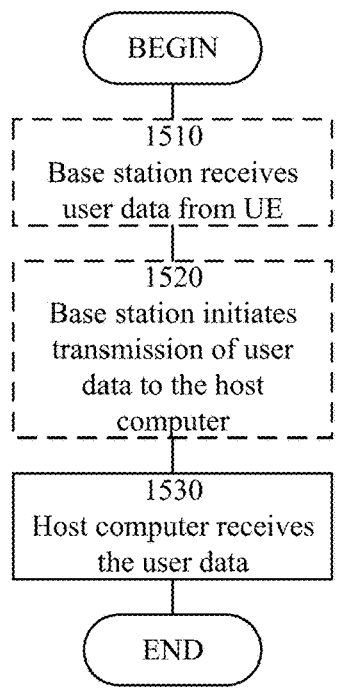
FIG. 15 is a flowchart illustrating example method steps implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

EXAMPLE EMBODIMENTS

Group A Embodiments

A1. A method performed by a wireless device for beamforming of a multi-antenna transmitter configured for operation in a listen-before-talk, LBT, environment, the method comprising:
transmitting—in all transmission resources of a collection of one or more transmission resources corresponding to an LBT sensing event—according to a primary emission pattern having a main lobe in a primary angular direction associated with a channel path towards an intended receiver; and
transmitting according to one or more secondary emission patterns, wherein the one or more secondary emission patterns—when accumulated over the collection of transmission resources corresponding to the LBT sensing event—are configured to indicate channel occupancy in angular directions other than the primary angular direction.

A2. The method of any of the previous embodiments in Group A, further comprising:
providing user data; and
forwarding the user data to a host computer via the transmission to the base station.

Group B Embodiments

B1. A method performed by a base station for beamforming of a multi-antenna transmitter configured for operation in a listen-before-talk, LBT, environment, the method comprising:
transmitting—in all transmission resources of a collection of one or more transmission resources corresponding to an LBT sensing event—according to a primary emission pattern having a main lobe in a primary angular direction associated with a channel path towards an intended receiver; and
transmitting according to one or more secondary emission patterns, wherein the one or more secondary emission patterns—when accumulated over the collection of transmission resources corresponding to the LBT sensing event—are configured to indicate channel occupancy in angular directions other than the primary angular direction.

B2. The method of any of the previous embodiments in Group B, further comprising:
obtaining user data; and
forwarding the user data to a host computer or a wireless device.

Group C Embodiments

C1. A wireless device for beamforming of a multi-antenna transmitter configured for operation in a listen-before-talk, LBT, environment, the wireless device comprising:
processing circuitry configured to perform any of the steps of any of the Group A embodiments; and
power supply circuitry configured to supply power to the wireless device.

C2. A base station for beamforming of a multi-antenna transmitter configured for operation in a listen-before-talk, LBT, environment, the base station comprising:
processing circuitry configured to perform any of the steps of any of the Group B embodiments;
power supply circuitry configured to supply power to the base station.

C3. A user equipment (UE) for beamforming of a multi-antenna transmitter configured for operation in a listen-before-talk, LBT, environment, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps described for the Group B embodiments.

D2. The communication system of embodiment D1 further including the base station.

D3. The communication system of any of embodiments D1 through D2, further including the UE, wherein the UE is configured to communicate with the base station.

D4. The communication system of any of embodiments D1 through D3, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps described for the Group B embodiments.

D6. The method of embodiment D5, further comprising, at the base station, transmitting the user data.

D7. The method of any of embodiments D5 through D6, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform the method of any of embodiments D5 through D7.

D9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps described for the Group A embodiments.

D10. The communication system of embodiment D9, wherein the cellular network further includes a base station configured to communicate with the UE.

D11. The communication system of any of embodiments D9 through D10, wherein:
the processing circuitry of the host computer is configured to execute a host application, thereby providing the user data; and
the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps described for the Group A embodiments.

D13. The method of embodiment D12, further comprising at the UE, receiving the user data from the base station.

D14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps described for the Group A embodiments.

D15. The communication system of embodiment D14, further including the UE.

D16. The communication system of any of embodiments D14 through D15, further including the base station, wherein the base station comprises a radio interface configured to communicate with the UE and a communication interface configured to forward to the host computer the user data carried by a transmission from the UE to the base station.

D17. The communication system of any of embodiments D14 through D16, wherein:
the processing circuitry of the host computer is configured to execute a host application; and
the UE's processing circuitry is configured to execute a client application associated with the host application, thereby providing the user data.

D18. The communication system of any of embodiments D14 through D17, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps described for the Group A embodiments.

D20. The method of embodiment D19, further comprising, at the UE, providing the user data to the base station.

D21. The method of any of embodiments D19 through D20, further comprising:
at the UE, executing a client application, thereby providing the user data to be transmitted; and
at the host computer, executing a host application associated with the client application.

D22. The method of any of embodiments D19 through D21, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A user equipment (UE) configured to communicate with a base station, the UE comprising a radio interface and processing circuitry configured to perform the method of any of embodiments D19 through D22.

D24. A communication system including a host computer comprising a communication interface configured to receive user data originating from a transmission from a user equipment (UE) to a base station, wherein the base station comprises a radio interface and processing circuitry, the base station's processing circuitry configured to perform any of the steps described for the Group B embodiments.

D25. The communication system of embodiment D24 further including the base station.

D26. The communication system of any of embodiments D24 through D25, further including the UE, wherein the UE is configured to communicate with the base station.

D27. The communication system of any of embodiments D24 through D25, wherein:
the processing circuitry of the host computer is configured to execute a host application;
the UE is configured to execute a client application associated with the host application, thereby providing the user data to be received by the host computer.

D28. A method implemented in a communication system including a host computer, a base station and a user equipment (UE), the method comprising:
at the host computer, receiving, from the base station, user data originating from a transmission which the base station has received from the UE, wherein the UE performs any of the steps described for the Group A embodiments.

D29. The method of embodiment D28, further comprising at the base station, receiving the user data from the UE.

D30. The method of any of embodiments D28 through D29, further comprising at the base station, initiating a transmission of the received user data to the host computer.

D31. A method implemented in a communication system including a host computer, a base station and a user equipment (UE), the method comprising:
at the host computer, receiving, from the base station, user data originating from a transmission which the base station has received from the UE, wherein the base station performs any of the steps described for the Group B embodiments.

D32. The method of embodiment D31, further comprising at the base station, receiving the user data from the UE.

D33. The method of any of embodiments D31 through D32, further comprising at the base station, initiating a transmission of the received user data to the host computer.

The invention claimed is:

1. A beamforming method of a multi-antenna transmitter configured for operation in a listen-before-talk (LBT) environment, the method comprising:
transmitting, in transmission resources of a collection of transmission resources corresponding to an LBT sensing event, according to a primary emission pattern having a main lobe in a primary angular direction associated with a channel path towards an intended receiver; and
transmitting according to one or more secondary emission patterns in one or more of the transmission resources corresponding to the LBT sensing event, such that the energy of the one or more secondary emission patterns, when accumulated over the collection of transmission resources corresponding to the LBT sensing event, is configured to indicate channel occupancy in angular directions other than the primary angular direction.

2. The method of claim 1, further comprising determining the primary angular direction.

3. The method of claim 1, wherein the primary emission pattern comprises a primary beam.

4. The method of claim 1, wherein the collection of transmission resources corresponding to the LBT sensing event comprises one or more of: time resources, frequency resources, and polarization resources.

5. The method of claim 1, wherein the one or more secondary emission patterns comprises a plurality of secondary emission patterns.

6. The method of claim 1, wherein the one or more secondary emission patterns have respective main lobes in angular directions uniformly spread in one or more angular ranges comprising one or more angular directions other than the primary angular direction.

7. The method of claim 1, wherein at least one of the one or more secondary emission patterns comprises at least one respective secondary beam.

8. The method of claim 7, wherein transmitting according to the one or more secondary emission patterns comprises executing a sweep of the respective secondary beams over the collection of transmission resources corresponding to the LBT sensing event.

9. The method of claim 1, wherein the one or more secondary emission patterns consists of a single secondary emission pattern.

10. The method of claim 1, wherein at least one of the one or more secondary emission patterns is an omni-directional emission pattern.

11. The method of claim 1, wherein transmitting according to the primary emission pattern is performed using a first group of antennas and transmitting according to the one or more secondary emission patterns is performed using a second group of antennas.

12. The method of claim 1, further comprising:
acquiring a balance parameter value that is indicative of a desired ratio between a peak energy of the primary emission pattern and an average energy of the one or more secondary emission patterns when accumulated over the collection of transmission resources; and
controlling the transmission according to the primary emission pattern and/or the transmission according to the one or more secondary emission patterns based on the balance parameter value.

13. The method of claim 12, wherein the average energy of the one or more secondary emission patterns when accumulated over the collection of transmission resources is lower than the peak energy of the primary emission pattern.

14. The method of claim 12, wherein acquiring the balance parameter value comprises one or more of:
determining the balance parameter value;
receiving a signal indicative of the balance parameter value; and
reading an identifier of balance parameter value from a storage.

15. The method of claim 12, wherein the balance parameter value is based on one or more of: an estimated impact of a hidden node problem, a metric quantifying a severity of the hidden node problem, a registered number of retransmissions, an estimated pathloss between the transmitter and a receiver other than the intended receiver, a location of a receiver other than the intended receiver, and a time and/or frequency usage pattern for a receiver other than the intended receiver.

16. The method of claim 15, wherein
a first balance parameter value corresponds to one or more of: an estimated first impact of the hidden node problem, a first metric quantifying the severity of the hidden node problem, a registered first number of retransmissions, an estimated first pathloss between the transmitter and the receiver other than the intended receiver, a first location of the receiver other than the intended receiver, and a first time and/or frequency usage pattern for the receiver other than the intended receiver,
a second balance parameter value corresponds to one or more of: an estimated second impact of the hidden node problem, a second metric quantifying the severity of the hidden node problem, a registered second number of retransmissions, an estimated second pathloss between the transmitter and the receiver other than the intended receiver, a second location of the receiver other than the intended receiver, and a second time and/or frequency usage pattern for the receiver other than the intended receiver, and
the first balance parameter value being higher than the second balance parameter value corresponds to one or more of: the estimated first impact of the hidden node problem being less detrimental than the estimated second impact of the hidden node problem, a first metric quantifying the severity of the hidden node problem being indicative of a lower severity that the second metric quantifying the severity of the hidden node problem, the registered first number of retransmissions being lower than the registered second number of retransmissions, the estimated first pathloss between the transmitter and the receiver other than the intended receiver being lower than the estimated first pathloss between the transmitter and the receiver other than the intended receiver, the first location of the receiver other than the intended receiver being closer to the transmitter than the second location of the receiver other than the intended receiver, and the first time and/or frequency usage pattern for the receiver other than the intended receiver having less overlap with the collection of transmission resources corresponding to the LBT sensing event than the second time and/or frequency usage pattern for the receiver other than the intended receiver.

17. A beamforming apparatus for a multi-antenna transmitter configured for operation in a listen-before-talk (LBT) environment, the apparatus comprising controlling circuitry configured to cause the apparatus to:
transmit, in transmission resources of a collection of transmission resources corresponding to an LBT sensing event, according to a primary emission pattern having a main lobe in a primary angular direction associated with a channel path towards an intended receiver; and
transmit according to one or more secondary emission patterns in one or more of the transmission resources corresponding to the LBT sensing event, such that the energy of the one or more secondary emission patterns, when accumulated over the collection of transmission resources corresponding to the LBT sensing event, is configured to indicate channel occupancy in angular directions other than the primary angular direction.

18. The apparatus of claim 17, wherein the one or more secondary emission patterns have respective main lobes in angular directions uniformly spread in one or more angular ranges comprising one or more angular directions other than the primary angular direction.

19. The apparatus of claim 17, wherein at least one of the one or more secondary emission patterns comprises at least one respective secondary beam.

20. The apparatus of claim 19, wherein transmission according to the one or more secondary emission patterns comprises execution of a sweep of the respective secondary beams over the collection of transmission resources corresponding to the LBT sensing event.

21. The apparatus of claim 17, wherein the controlling circuitry is configured to cause the transmission according to the primary emission pattern to be performed using a first group of antennas, and transmission according to the one or more secondary emission patterns to be performed using a second group of antennas.

22. The apparatus of claim 17, wherein the controlling circuitry is further configured to cause the apparatus to:
acquire a balance parameter value which is indicative of a desired ratio between a peak energy of the primary emission pattern and an average energy of the one or more secondary emission patterns when accumulated over the collection of transmission resources; and control the transmission according to the primary emission pattern and/or the transmission according to the one or more secondary emission patterns, based on the balance parameter value.

23. The apparatus of claim 22, wherein the average energy of the one or more secondary emission patterns when accumulated over the collection of transmission resources is lower than the peak energy of the primary emission pattern.

24. The apparatus of claim 22, wherein the apparatus is configured to acquire the balance parameter value by one or more of:
   determining the balance parameter value;
   receiving a signal indicative of the balance parameter value; and
   reading an identifier of balance parameter value from a storage.

25. The apparatus of claim 22, wherein the balance parameter value is based on one or more of: an estimated impact of a hidden node problem, a metric quantifying a severity of the hidden node problem, a registered number of retransmissions, an estimated pathloss between the transmitter and a receiver other than the intended receiver, a location of a receiver other than the intended receiver, and a time and/or frequency usage pattern for a receiver other than the intended receiver.

26. The apparatus of claim 25, wherein
   a first balance parameter value corresponds to one or more of: an estimated first impact of the hidden node problem, a first metric quantifying the severity of the hidden node problem, a registered first number of retransmissions, an estimated first pathloss between the transmitter and the receiver other than the intended receiver, a first location of the receiver other than the intended receiver, and a first time and/or frequency usage pattern for the receiver other than the intended receiver, a second balance parameter value corresponds to one or more of: an estimated second impact of the hidden node problem, a second metric quantifying the severity of the hidden node problem, a registered second number of retransmissions, an estimated second pathloss between the transmitter and the receiver other than the intended receiver, a second location of the receiver other than the intended receiver, and a second time and/or frequency usage pattern for the receiver other than the intended receiver, and the first balance parameter value being higher than the second balance parameter value corresponds to one or more of: the estimated first impact of the hidden node problem being less detrimental than the estimated second impact of the hidden node problem, a first metric quantifying the severity of the hidden node problem being indicative of a lower severity that the second metric quantifying the severity of the hidden node problem, the registered first number of retransmissions being lower than the registered second number of retransmissions, the estimated first pathloss between the transmitter and the receiver other than the intended receiver being lower than the estimated first pathloss between the transmitter and the receiver other than the intended receiver, the first location of the receiver other than the intended receiver being closer to the transmitter than the second location of the receiver other than the intended receiver, and the first time and/or frequency usage pattern for the receiver other than the intended receiver having less overlap with the collection of transmission resources corresponding to the LBT sensing event than the second time and/or frequency usage pattern for the receiver other than the intended receiver.

* * * * *